United States Patent
Varia et al.

(10) Patent No.: US 10,904,086 B1
(45) Date of Patent: Jan. 26, 2021

(54) DEVICE CAPABILITIES MANAGEMENT FROM A SERVICE PROVIDER ENVIRONMENT

(71) Applicant: Amazon Technologies, Inc., Seattle, WA (US)

(72) Inventors: Jinesh Varia, Bothell, WA (US); Aditya Bhalla, Shoreline, WA (US); Alex Levin, Cupertino, CA (US); Bhadri Pani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/282,610

(22) Filed: Sep. 30, 2016

(51) Int. Cl.
*H04L 29/06* (2006.01)
*H04L 12/24* (2006.01)
*H04L 29/08* (2006.01)
*H04L 12/26* (2006.01)
*G06F 9/4401* (2018.01)

(52) U.S. Cl.
CPC ........ *H04L 41/0816* (2013.01); *G06F 9/4401* (2013.01); *H04L 43/0876* (2013.01); *H04L 63/108* (2013.01); *H04L 67/12* (2013.01)

(58) Field of Classification Search
CPC ................................. H04L 63/00; G06F 21/00
See application file for complete search history.

(56) References Cited

U.S. PATENT DOCUMENTS

| | | | |
|---|---|---|---|
| 6,876,668 B1 | 4/2005 | Chawla et al. | |
| 8,024,808 B1 | 9/2011 | Gleichauf | |
| 9,538,616 B2 * | 1/2017 | Dijk | H05B 37/0245 |
| 9,769,131 B1 | 9/2017 | Hartley et al. | |
| 9,894,471 B1 * | 2/2018 | Zalewski | H04L 67/10 |
| 9,924,392 B2 * | 3/2018 | Cote | H04W 24/08 |
| 2005/0132351 A1 | 6/2005 | Randall et al. | |
| 2007/0002897 A1 | 1/2007 | Goshen | |
| 2009/0007091 A1 | 1/2009 | Appiah et al. | |
| 2009/0150893 A1 | 6/2009 | Johnson et al. | |

(Continued)

OTHER PUBLICATIONS

GSM Association, IMS Device Configuration and Supporting Services, Version 1.0, Feb. 2, 2015, 34 pages, GSMA, London, United Kingdom.

(Continued)

*Primary Examiner* — Joseph P Hirl
*Assistant Examiner* — Leynna Truvan
(74) *Attorney, Agent, or Firm* — Davis Wright Tremaine LLP

(57) ABSTRACT

A technology is described for managing device performance capabilities. An example method may include connecting a physical device electronically to a service provider environment using a computer network and identifying performance capabilities of the physical device at the service provider environment via the connection. A request may be received at the service provider environment to upgrade the performance capabilities of the physical device and an authorization may also be received at the service provider environment for the upgrade. The performance capabilities of the physical device may be upgraded by sending an upgrade instruction from the service provider environment to the physical device to unlock additional performance capabilities based on the authorization. The performance capabilities of the physical device may later be downgraded to by disabling the additional performance capabilities of the physical device.

21 Claims, 8 Drawing Sheets

(56) References Cited

U.S. PATENT DOCUMENTS

| | | |
|---|---|---|
| 2010/0020685 A1 | 1/2010 | Short et al. |
| 2010/0202450 A1 | 8/2010 | Ansari et al. |
| 2012/0047551 A1 | 2/2012 | Pattar et al. |
| 2012/0295510 A1 | 11/2012 | Boeckle |
| 2013/0139154 A1 | 5/2013 | Shah |
| 2014/0183957 A1* | 7/2014 | Duchesneau ......... F01K 13/006 307/64 |
| 2014/0229928 A1 | 8/2014 | Edstrom et al. |
| 2015/0347683 A1 | 12/2015 | Ansari et al. |
| 2016/0036719 A1 | 2/2016 | Alicherry et al. |
| 2016/0092871 A1 | 3/2016 | Gordon et al. |
| 2016/0191723 A1 | 6/2016 | Yue |
| 2017/0075676 A1 | 3/2017 | Li |
| 2017/0085686 A1 | 3/2017 | Gilchrist et al. |
| 2017/0180147 A1 | 6/2017 | Brandman et al. |
| 2017/0366586 A1 | 12/2017 | Bloesch et al. |
| 2018/0068091 A1 | 3/2018 | Gaidar et al. |
| 2018/0183765 A1 | 6/2018 | Neumann et al. |

\* cited by examiner

DEVICE CAPABILITIES MANAGEMENT FROM A SERVICE PROVIDER ENVIRONMENT

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for the purpose of transmitting status and receiving external control communications.

DETAILED DESCRIPTION

Figure 1:
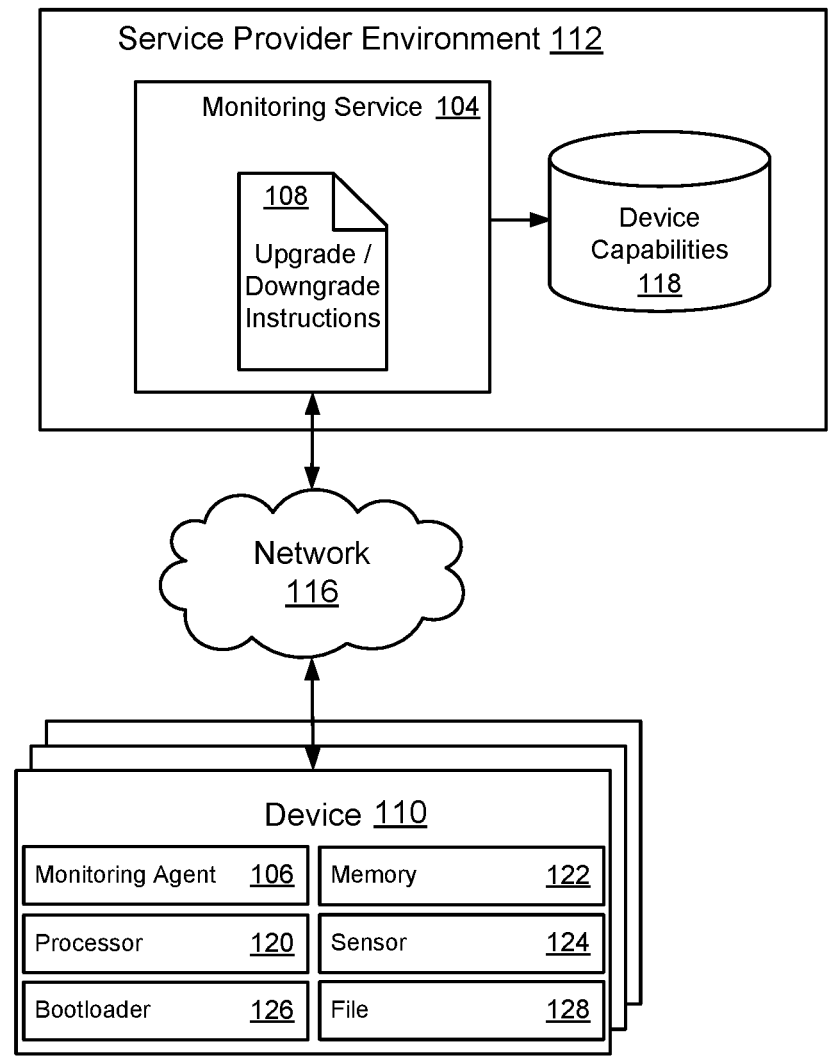
FIG. 1 is a block diagram illustrating a system for device capabilities management in accordance with an example of the present technology.

A technology is described for remotely controlling or managing IoT (Internet of Things) device performance or hardware capabilities or other internet connected device performance or hardware capabilities on demand or dynamically. A device may be one of many devices that create a large network of addressable devices. This "network" is commonly referred to as the Internet of Things (IoT). An IoT device may be connected electronically to a service provider environment that is separate or remote from the physical computing device. Demand on or utilization of the physical computing device (e.g., processor utilization, memory utilization, network utilization, etc.) may be monitored from the service provider environment. For example, the service provider environment may monitor which applications are executing, data storage resource usage, CPU utilization, latency, memory usage, error rates, network bandwidth utilization, network addresses to/from which data is transmitted/received, capabilities of peripherals, sensors and actuators and so forth. The technology may determine whether performance capabilities of the physical computing device exceed the utilization of the IoT device using the monitored data. The performance capabilities of the IoT device may be downgraded from the service provider environment when the performance capabilities exceed the utilization, such as where the performance capabilities are more than a predetermined threshold greater than is used according to the utilization. For example, when the performance capabilities exceed the utilization, the performance capabilities of the IoT device may be downgraded from the service provider environment, such as by sending a configuration file, instruction, command or setting from the service provider environment remotely to the IoT device and implementing the configuration file or setting at the IoT device.

In another example of the present technology, a method may include connecting a physical device electronically to a service provider environment that may be physically distant or remote from the physical device to form a connection using a computer network. A request may be received at the service provider environment to upgrade the performance capabilities of the physical device. An authorization, such as a payment, may be received at the service provider environment for the upgrade. For example, an administrator or user may submit the request and the payment to the service provider environment, or the request and payment may be sent to the service provider environment from the physical device when utilization on the physical device exceeds performance capabilities of the physical device. The performance capabilities of the physical device may be upgraded by sending an upgrade setting or configuration instructions from the service provider environment to the physical device to unlock additional performance capabilities for a defined period of time based at least in part on the payment. For example, a determination to modify the performance capabilities of the device may be made at the service provider environment. The determination may be made based on one or more considerations, such as utilization, payment, customer request, etc. The defined period of time for the modified capabilities may be determined, at least in part, based on the payment. For example, if the customer pays for 1 hour or 1 week of upgraded capabilities, the additional performance capabilities will be available to the customer for that defined time period. The performance capabilities of the physical device may be subsequently downgraded by disabling the additional performance capabilities of the physical device at the expiration of the predetermined period of time. In some examples, upgrading or downgrading the performance capabilities may include changing a clock speed of the processor, changing a number of available cores of the processor, changing a partition size of storage for the physical device, changing available memory for the physical device, etc.

In another example of the present technology, performance capabilities of the physical device may be obtained by and identified at the service provider environment via an electronic network connection between the service provider environment and the physical device. Performance of the physical computing device and utilization placed on the physical computing device may be monitored from the service provider environment. The performance capabilities of the physical computing device may be altered at a first time by sending an upgrade instruction from the service provider environment to the physical computing device and may be altered at a second time by sending a downgrade instruction from the service provider environment to the physical computing device. As a practical example, the service provider environment may determine, based on a payment from a customer, a sale or promotion, or any other suitable condition, to modify the performance capabilities. The service provider environment may send the upgrade instruction such as to add a processor core, add a WiFi antenna, and change the processing frequency. There is no particular limitation on which hardware configurations may be changed, how the configuration may be changed, or how many configurations may be changed at a time as long as the configuration changes are supported by the hardware of the physical computing device. As another example, the physical computing device may enable one or more processor cores at a particular time of day (e.g., every night at 2:00 a.m.) automatically, according to a schedule, based on a configuration setting at the service provider environment, or alternatively may disable one or more processor cores based on a different configuration setting at the service provider environment and/or based on battery utilization in order to conserve battery charge for a battery-powered device.

FIG. 1 is a block diagram illustrating a high level example of a system and method for controlling device 110 performance capabilities from a service provider environment 112. A monitoring agent 106 on the device 110 may collect metrics about the device 110 and transmit these metrics to the monitoring service 104. The service provider environment 112 may access a data store of device capabilities 118 to store and/or identify current performance capabilities of the device 110. For example, the device capabilities 118 may be determined for a device type or the device capabilities 118 may be known for a specific physical device. The monitoring service 104 may compare the metrics received from the device 110 to the performance capabilities. Then the monitoring service 104 may report the comparison to a user or take an action authorized by the user or another party, such as to upgrade or downgrade the performance capabilities of the device 110, by sending upgrade or downgrade instructions 108 over a network 116 to the device 110.

The service provider environment 112 may dynamically control the performance of the device, such as to control the device processor 120 (e.g., cores, cycles, speed, processing, etc.), sensor 124 and actuator configurations on the board of the device or of a peripheral device, memory 122 and other characteristics of the device 110 from the service provider environment 112. For example, by controlling the performance of the processor 120 dynamically, the customer experience can be enhanced for a customer using, accessing or owning the device 110.

Using configuration instructions sent from the service provider environment 112, the system may manage throttling, clock speeds, available cores, memory partition sizes, RAM (Random Access Memory), other peripherals, etc. from the monitoring service 104 dynamically when the customer needs or requests modifications, and provide upgrades or downgrades to these performance capabilities. For example, a car may be upgraded from 120 HP (horse power) to 240 HP during the weekend for $100. Alternatively, in exchange for the $100, the service provider environment may monitor and manage the car such that additional HP is made available to the car based on utilization of the car, using some of the pre-paid $100 fee each time the additional HP is made available until the $100 is exhausted. A media server may be upgraded to quad core processing at nights. An additional processor core may be temporarily enabled for processing high definition video in exchange for a fee. An IoT device may be a peripheral device during the day, collecting data (low power), and a hub (transmitting data or running rules/or complex processing) during the night as may be managed from the service provider environment 112. In a similar example, an IoT device sometimes collects more data than the IoT device may transmit. The data may be compiled or stored for future compilation at a local network edge or on the IoT device, and the compiled data may be sent to reduce data transmissions, with full flexibility manageable by the manufacturer, customer or other entity.

Some hardware manufacturers for economies of scale produce large quantities of a hardware design and artificially limit some configurations (e.g., by physically disabling the hardware) in order to maintain the economies of scale while making different price points and differently configured models available. These may include the same hardware but with some throttled down configurations. The present technology enables modification of these artificial limitations. For example, the device 110 and processor 120 may be upgraded if users pay an extra upgrade fee without replacing the processor hardware. As another example, a storage drive may be upgraded from 1 TB to 2 TB (Tera bytes) for an additional $30 for a month. Hardware manufacturers and other entities (e.g., original equipment manufacturers (OEMs)) may use the present technology to implement additional business models, and/or also control the business models using a simple management console or graphical user interface when circumstances change or to improve a customer's experience or the service provided.

FIG. 1 illustrates components of an example system on which the present technology may be executed. The system may include a plurality of the devices 110 in communication with the service provider environment 112 via one or more networks 116. Non-limiting examples of the devices 110 may include network addressable: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over the network 116.

Figure 4:
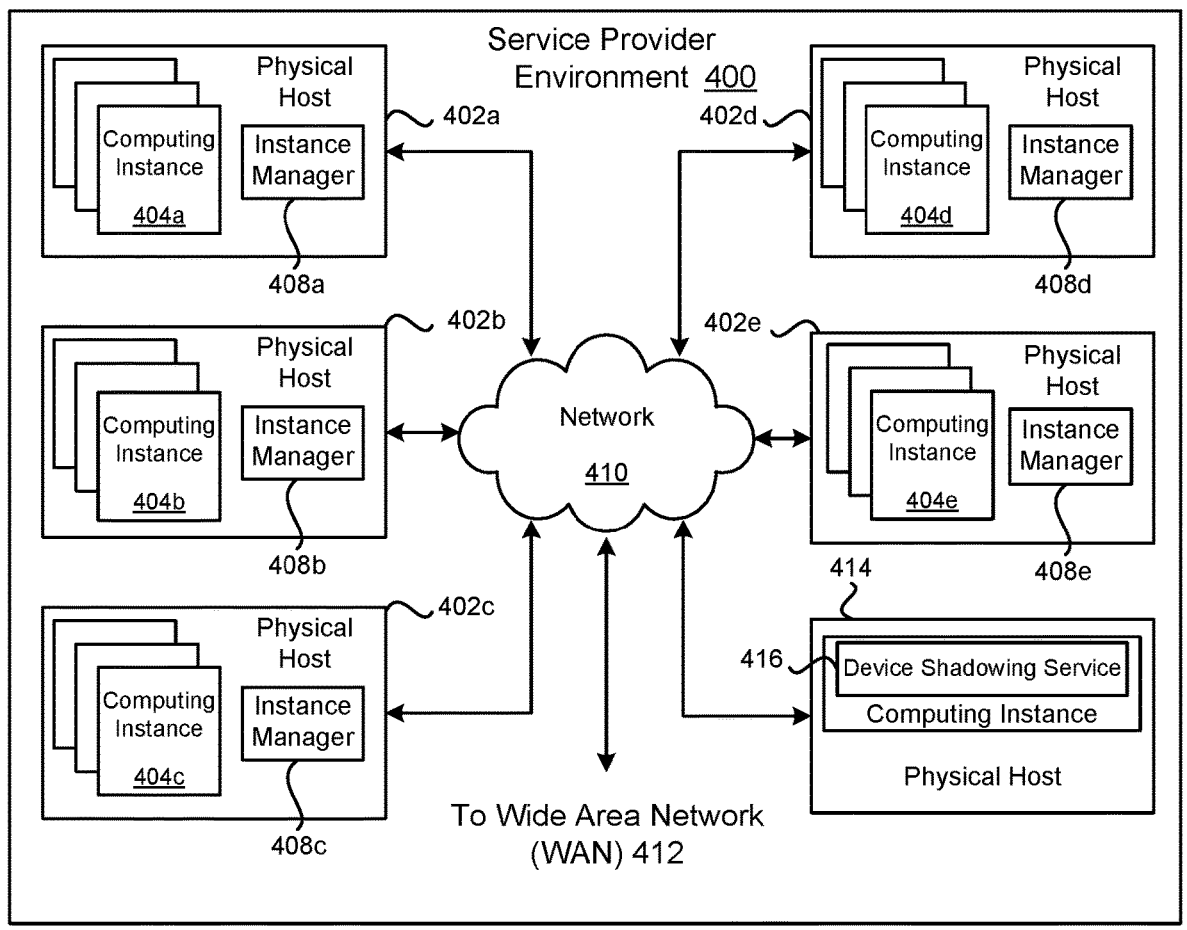
FIG. 4 is a block diagram that illustrates a service provider environment that includes a device shadowing service in accordance with an example of the present technology.

The service provider environment 112 may include servers for executing computing instances (e.g., virtual machines) as described in relation to FIG. 4. The computing instances may host various services associated with the devices 110. The system may enable one-to-one and one-to-many communications. A one-to-many communication pattern may allow a device 110 to broadcast data to multiple subscribers for a given topic. For example, a system component may publish a message to a named logical channel (e.g., topic) and the message may be distributed to subscribed system components. System components may include, but are not limited to, the devices 110, clients, applications and services (e.g., monitoring service 104), etc.

The various processes and/or other functionality contained on the system components included in the system may be executed on one or more processors that are in communication with one or more memory modules. The system may include a number of computing devices that are arranged, for example, in one or more server banks or computer banks or other arrangements. The computing devices may support the service provider environment 112 using hypervisors, virtual machine monitors (VMMs) and other virtualization software.

Device capabilities 118 and the like may be stored in one or more data stores. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 112 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 116 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1 illustrates an example of a system that may implement the techniques above, many other similar or different environments are possible. The example environments discussed and illustrated above are merely representative and not limiting.

Figure 2:
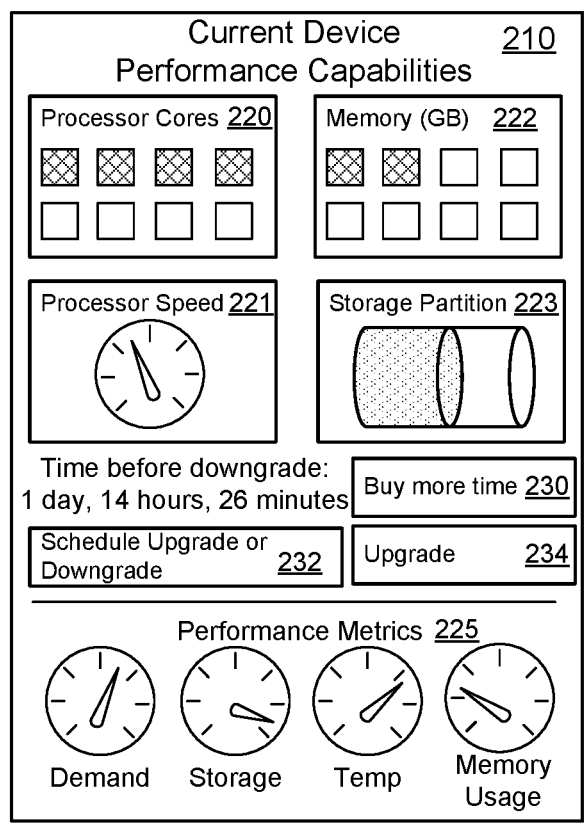
FIG. 2 is a diagram that illustrates a graphical user interface to manage device capabilities from a service provider environment in accordance with an example of the present technology.

FIG. 2 illustrates an example graphical user interface (GUI) 210 for managing a device. The GUI 210 may be provided from the service provider environment by the monitoring service, for example. A network address, API (application programming interface), or the like may be used to access the GUI 210.

The GUI 210 may display current device performance capabilities, such as, for example, processor cores 220, memory 222, processor speed 221, storage partition 223 and the like. In this example, the processor may have eight processor cores 220 represented by the eight boxes, with four of the boxes shaded to represent that the device may currently access and use of to four of the eight available cores. The user may upgrade 234 the processor cores 220 to unlock or enable the additional four cores. Similarly, the memory 222 illustrates of eight available gigabytes (GB) of memory, two GB are currently available to use. The processor speed 221 maximum is locked at a little under half of the actual capable speed of the processor. Likewise, the storage partition 223 space is limited to approximately half of the devices actual storage capabilities. Any of these capabilities 220-223 may be upgraded on demand, for a fee, and/or for other reasons, such as based on a type of data being processed, a source of video being received, etc.

The GUI 210 illustrates a time remaining before a downgrade, indicating that the user (e.g., manufacturer, end-user, or other entity) previously requested or otherwise received an upgrade which will expire soon. Users may purchase more time 230 to extend the current device performance capabilities. Without purchasing more time 230 or upgrading 234, one or more of the performance capabilities 220-223 may be downgraded at the expiration of the time period.

The GUI 210 further illustrates performance metrics 225 which may be reported to a user. The performance metrics 225 are performance metrics for the device. This example illustrates some metrics such as (processor) utilization, storage utilization, device or processor temperature and memory usage. Any number of metrics of any type may be illustrated based on the monitoring of the device from the service provider environment.

In some examples not shown, the GUI 210 may enable scheduling of upgrades or downgrades, or may simply enable manual downgrading of the performance capabilities. In other words, the GUI 210 may be used to dynamically control components of a system. Some examples that have been described include processor cores, radio (wife/cellular), memory management, sensors, etc., which are often parts of device boards today. In one example, a user may be holding a party on a specified date at a specified time and may desire to upgrade a wireless router to accommodate an anticipated increased number of people accessing and using the wireless router. The user may thus schedule the upgrade to happen in time for the party, where the upgrade may include enabling an additional WiFi antenna on the wireless router. A downgrade after the party is over may also be scheduled in advance. The performance capabilities may be controlled on demand, remotely, from the service provider environment over a network. The monitoring service may enable fine grained access to controlling devices. Even small savings may add a lot of value where there are a large number of devices.

In one example, the upgrading or downgrading of a processor may include overclocking or underclocking the processor. The monitoring service may enable dynamic control for period of time in order to provide a better experience for that timeframe and or for applications used within the timeframe. Processor performance changes may specify temporary upgrades and scale back down when the upgrade is no longer useful to meet demand, such as when the utilization decreases. In one example, a decreased capabilities mode of the device may provide a benefit to a user. For example, electricity or other costs may be reduced. As another example, a manufacturer or other entity may incentivize users to use the decreased capabilities mode, or eco mode, by reducing a cost of services provided, by providing discounts, rebates or other monetary incentives, etc. As another example, temporary upgrades may cost the user additional money to use the additional performance capabilities.

Upgrading or downgrading the performance capabilities of the device may include, for example, using upgrade/downgrade instructions 108 sent from the monitoring service 104 to the device 110 over a network 116 (see FIG. 1). The instructions may be setting changes, file modifications, new or replacement files, etc. In one example, the instructions are applied to a bootloader 126 of the device and the device is rebooted per the instructions to complete the upgrade or downgrade. Other upgrades or downgrades may be made by making changes to a file 128 or setting without rebooting. Processor clock cycle modifications may not involve a reboot, for example. For some changes, although a reboot may not be performed, some applications may be restarted. What is involved in the upgrade or downgrade may depends on what is being upgraded or downgraded.

In one example, a device may be provided with a processor that is produced in mass scale. Small, large and extra-large capability IoT devices may be sold at different price points for different capacities by changing the configuration post-manufacture by sending instructions to the device from the service provider environment. The ability to make the modifications may be restricted to a particular entity (e.g., the manufacturer) or may be accessible by any entity with the device (e.g., customers) to upgrade or downgrade capabilities.

As one example, a device may be a surveillance camera. The camera may be provided with a processor. Different configurations of the same device that may be managed from the service provider environment may include limiting the device to capturing still images, enabling the device to capture both still images and video, and enabling the device to capture still images, video, and use night vision capabilities. In each case, while the device is the same, manufacturer is able to provide three different configurations, managed in the cloud, and serve three different types of customer after the device is manufactured and purchased by simply disabling or enabling the capability from the service provider environment.

In one example, the monitoring service may determine an optimum processing speed to not overheat the device, for example. The monitoring service may analyze usage and determine that the user does not use the whole package or capabilities of the system at certain times or for certain activities and may reduce the device capabilities to extend the lifetime of the device, reduce power consumption, etc.

In one example, the device may include a wireless radio that may be configured. Some customers may want to pay for higher speeds or increased bandwidth. Performance capability modifications may include, for example, wifi changes from 801.11g to 801.11n protocols for higher speeds, or may optimize usage of wifi/cellular/NFC/zigbee/etc.

The monitoring service may make inferences based on customer usage to help the customers make better decisions of what the configuration should be at certain times, for certain applications, etc. The monitoring service may predict when the device will fail based on historical trends of other devices but may also determine an optimum performance schedule to sustain the device usage for an extended period of time.

The GUI 210 may also enable scheduling 232. For example, the pending downgrade illustrated in FIG. 2 may not be resulting from an expiring paid upgrade, but may be a scheduled downgrade. For a given period of time, such as during the night, a device may downgrade to run in a hibernate mode rather than high capacity mode, or alternatively may upgrade to perform more processing during the night time than is performed during the daytime. For more eco-friendly modes, devices running at speed may receive a slight performance capability reduction to save energy while continuing the perform tasks. For example, one or more cores may be shut down, processor cycles may be reduced, etc.

Figure 3:
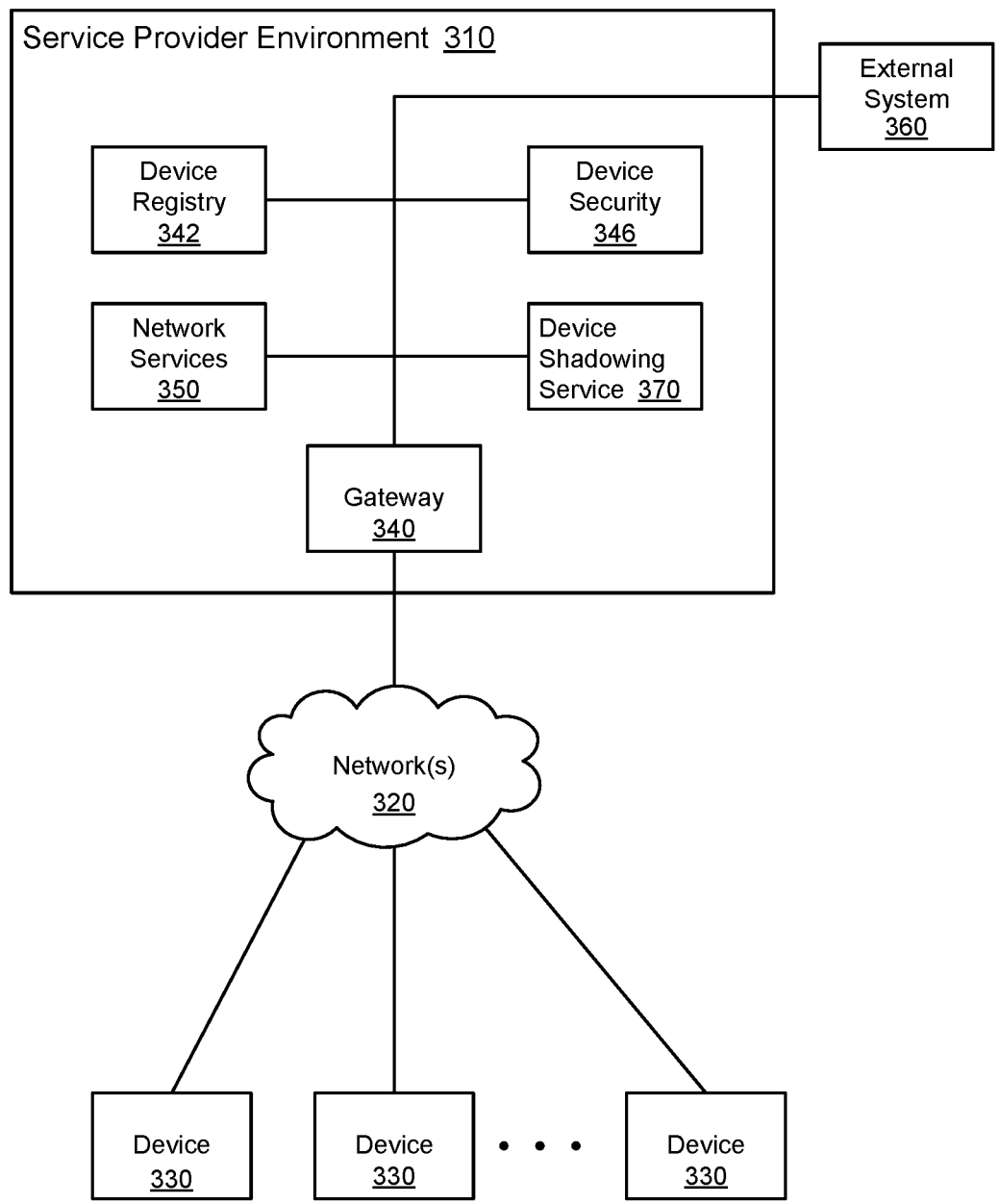
FIG. 3 is a block diagram illustrating a computer networking architecture for providing devices access to network services in accordance with an example of the present technology.

FIG. 3 is a block diagram illustrating an example service provider environment 310 with which the devices 330 described earlier may communicate. The service provider environment 310, which may be referred to as a device communication environment or system that comprises various resources made accessible via a gateway 340 to the devices 330 that access the gateway 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway 340 may be configured to provide an interface between the devices 330 and the service provider environment 310. The gateway 340 receives requests from the devices 330 and forwards corresponding data and messages to the appropriate systems within the service provider environment 310. Likewise, when systems within the service provider environment 310 attempt to communicate data instructions to the devices 330, the gateway 340 routes those requests to the correct device 330.

The gateway 340 may be adapted to communicate with varied devices 330 using various different computing and communication capabilities. For example, the gateway 340 may be adapted to communicate using either TCP (Transmission Control Protocol) or UDP (User Datagram Protocol) protocols. Likewise, the gateway 340 may be programmed to receive and communicate with the devices 330 using any suitable protocol including, for example, MQTT, CoAP, HTTP, HTTP/2, AMQP, and HTTPS. The gateway 340 may be programmed to convert the data and instructions or messages received from the devices 330 into a format that may be used by other server systems or services comprised in the service provider environment 310. In one example, the gateway 340 may be adapted to convert a message received using the HTTPS protocol into a JSON formatted message that is suitable for communication to other servers or services within the service provider environment 310.

The gateway 340 may store, or may control the storing, of information regarding the devices 330 that have formed a connection to the particular gateway 340 and for which the particular gateway 340 may be generally relied upon for communications with the device 330. In one example, the gateway 340 may have stored thereon information specifying the particular device 330 such as a device identifier. For each connection established from the particular device 330, the gateway 340 may also maintain information identifying the connection. For example, a connection identifier may be generated and stored for each connection established with a particular device 330. Information relating to the particular connection may also be stored. For example, information identifying the particular socket of the gateway 340 on which the connection was established, as well as information identifying the particular protocol used by the device 330 on the connection may be stored by the gateway 340. Information such as the socket and protocol may be used in order to facilitate further communications via the particular connection.

In one example, the gateway 340 may communicate via any suitable networking technology with a device registry 342. The device registry 342 may be adapted to track the attributes and capabilities of each device 330. In an example, the device registry 342 may be provisioned with information specifying the attributes of the devices 330. The device registry 342 may comprise data specifying rules or logic (e.g., automation rules) for handling various requests that may be received from the devices 330. The device registry 342 may be programmed to convert specialized device functions or commands received in particular communication protocols such as, for example HTTPS, MQTT, CoAP, into functions or commands using particular protocols that are understood by other of the servers or services in the service provider environment 310. In one example, the device registry 342 may be provisioned with information specifying that upon receipt of a particular request from a particular device 330, a request should be made to store the payload data of the request in a particular network service 350. The device registry 342 may be similarly programmed to receive requests from device registry 342 and network services 350 and convert those requests into commands and protocols understood by the devices 330.

The device shadowing service 370 maintains state information for each connected device 330. In an example embodiment, the device shadowing service 370 maintains for each device 330 that has connected to the environment 310 information specifying a plurality of states. In an example scenario, the device shadowing service 370 may comprise a recorded state and a desired state. The recorded state represents the existing state of the particular device 330 as presently known to the device shadowing service 370. The device shadowing service 370 may be configured to manage multi-step device state transitions as described earlier. The device shadowing service 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security service 346 maintains security-related information for the devices 330 that connect to the service provider environment 310. In one example, the device security service 346 may be programmed to process requests to register devices with the service provider environment 310. For example, entities such as device manufacturers, may forward requests to register devices 330 with the service provider environment 310. The device security service 346 receives registration requests and assigns unique device identifiers to devices 330 which use the device identifiers on subsequent requests to access the service provider environment 310. The device security service 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security service 346 for evaluation. The device security service 346 determines whether authentication information provided in the request is consistent with the authentication information stored in relation to the device identifier and provided during the registration process.

The device security service 346 may be further programmed to process request to associate particular entities (individuals or organizations) with particular devices 330. The device security service 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web service which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security service 346 stores the information identifying the particular entity in relation with the device identifier. When the particular entity subsequently attempts to control or communicate data to the particular device 330, the device security service 346 may use the information to confirm that the particular entity is authorized to communicate with or control the particular device 330. When an entity that has not been registered as being authorized to communicate with the device 330 attempts to communicate with or control the device 330, the device security service 346 may use the information stored in the device security service 346 to deny the request.

A network service 350 may be any resource or processing service that may be used by any of services 340, 342, 346, or 370 in processing requests from the devices 330. In one example, network services 350 may provide data storage and retrieval services and/or on-demand processing capacity. In an example scenario, the network services 350 may be any of numerous network accessible services including, for example, web or cloud-based services. In one example, the network services 350 may be programmed to provide particular processing for particular devices 330 and/or groups of devices 330. For example, a network service 350 may be provisioned with software that coordinates the operation of a particular set of devices 330 that control a particular manufacturing operation.

Services 340, 342, 346, 350, and 370 may be communicatively coupled via any suitable networking hardware and software. For example, the services may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server or service operated by or for a device manufacturer that sends requests to service provider environment 310, and device security service 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services 350. While FIG. 3 depicts three devices 330, it will be appreciated that any number of devices 330 may access the service provider environment 310 via the gateway 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway 340 may be programmed to receive and, if needed, attend to converting such requests for processing with the service provider environment 310.

FIG. 4 is a block diagram illustrating an example service provider environment 400 that may be used to execute and manage a number of computing instances 404a-e. In particular, the service provider environment 400 depicted illustrates one environment in which the technology described herein may be used. The service provider environment 400 may be one type of environment that includes various virtualized service resources that may be used, for instance, to host computing instances 404a-e.

The service provider environment 400 may be capable of delivery of computing, storage and networking capacity as a software service to a community of end recipients. In one example, the service provider environment 400 may be established for an organization by or on behalf of the organization. That is, the service provider environment 400 may offer a "private cloud environment." In another example, the service provider environment 400 may support a multi-tenant environment, wherein a plurality of customers may operate independently (i.e., a public cloud environment). Generally speaking, the service provider environment 400 may provide the following models: Infrastructure as a Service ("IaaS"), Platform as a Service ("PaaS"), and/or Software as a Service ("SaaS"). Other models may be provided. For the IaaS model, the service provider environment 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 400 without incurring the cost of buying and managing the underlying hardware and software. The SaaS model allows installation and operation of application software in the service provider environment 400. End customers may access the service provider environment 400 using networked client devices, such as desktop computers, laptops, tablets, smartphones, etc. running web browsers or other lightweight client applications, for example. Those familiar with the art will recognize that the service provider environment 400 may be described as a "cloud" environment.

The particularly illustrated service provider environment 400 may include a plurality of physical hosts 402a-e. While six physical hosts are shown, any number may be used, and large data centers may include thousands of physical hosts. The service provider environment 400 may provide computing resources for executing computing instances 404a-e. Computing instances 404a-e may, for example, be virtual machines. A virtual machine may be an instance of a software implementation of a machine (i.e. a computer) that executes applications like a physical machine. In the example of a virtual machine, each of the physical hosts 402a-e may be configured to execute an instance manager 408a-e capable of executing the instances. The instance manager 408a-e may be a hypervisor, virtual machine monitor (VMM), or another type of program configured to enable the execution of multiple computing instances 404a-e on a single server. Additionally, each of the computing instances 404a-e may be configured to execute one or more applications.

A server 414 may execute a device shadowing service 416 configured to execute the functions described earlier. In one example, the device shadowing service 416 may be hosted by one or more computing instances 404a-e. In some examples, one or more computing instances 404a-e may be configured to host instances of compute service code that may be called to update the state of a device that interfaces with the device shadowing service 416.

A network 410 may be utilized to interconnect the service provider environment 400 and the physical hosts 402a-e, 414. The network 410 may be a local area network (LAN) and may be connected to a Wide Area Network (WAN) 412 or the Internet, so that end customers may access the service provider environment 400. The network topology illustrated in FIG. 4 has been simplified, many more networks and networking devices may be utilized to interconnect the various computing systems disclosed herein.

Figure 5:
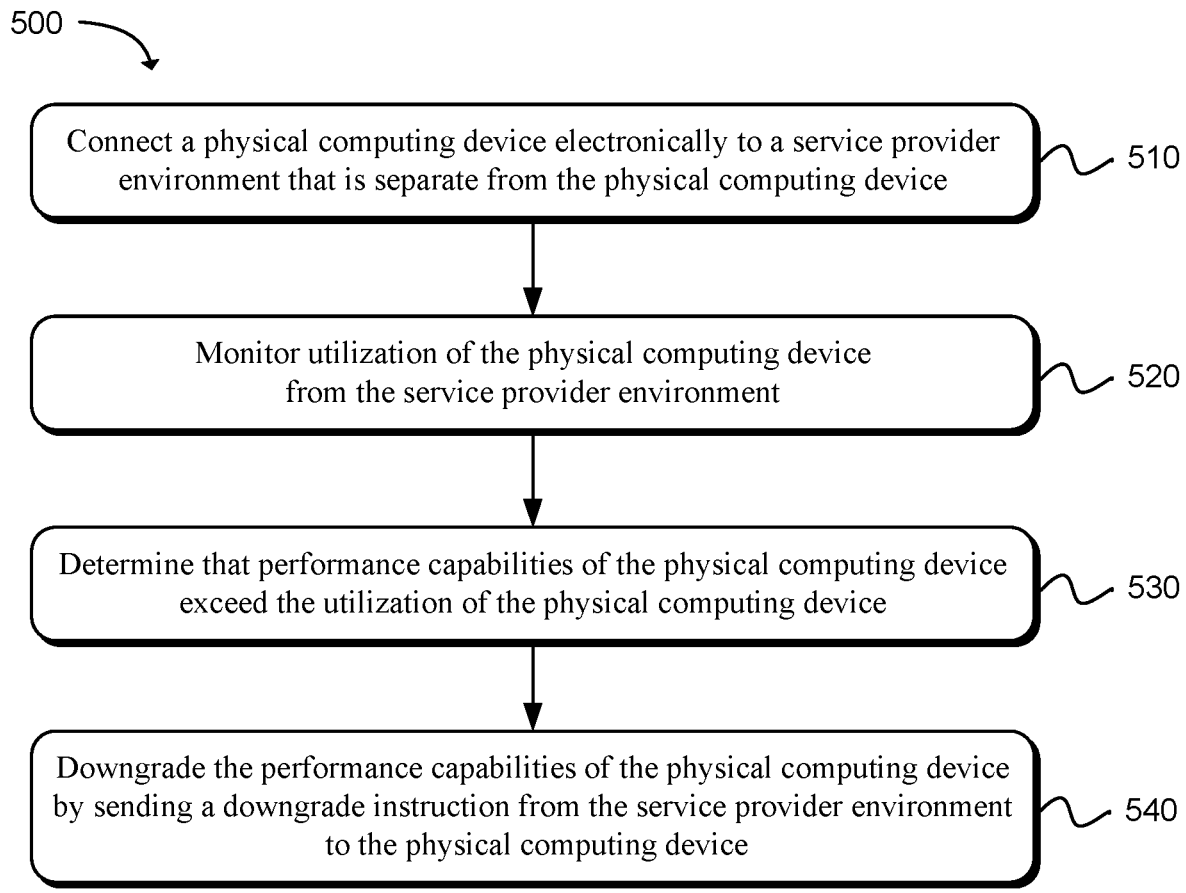
FIG. 5 is a flow diagram illustrating a method for downgrading performance capabilities of a device based on utilization in accordance with an example of the present technology.
Figure 6:
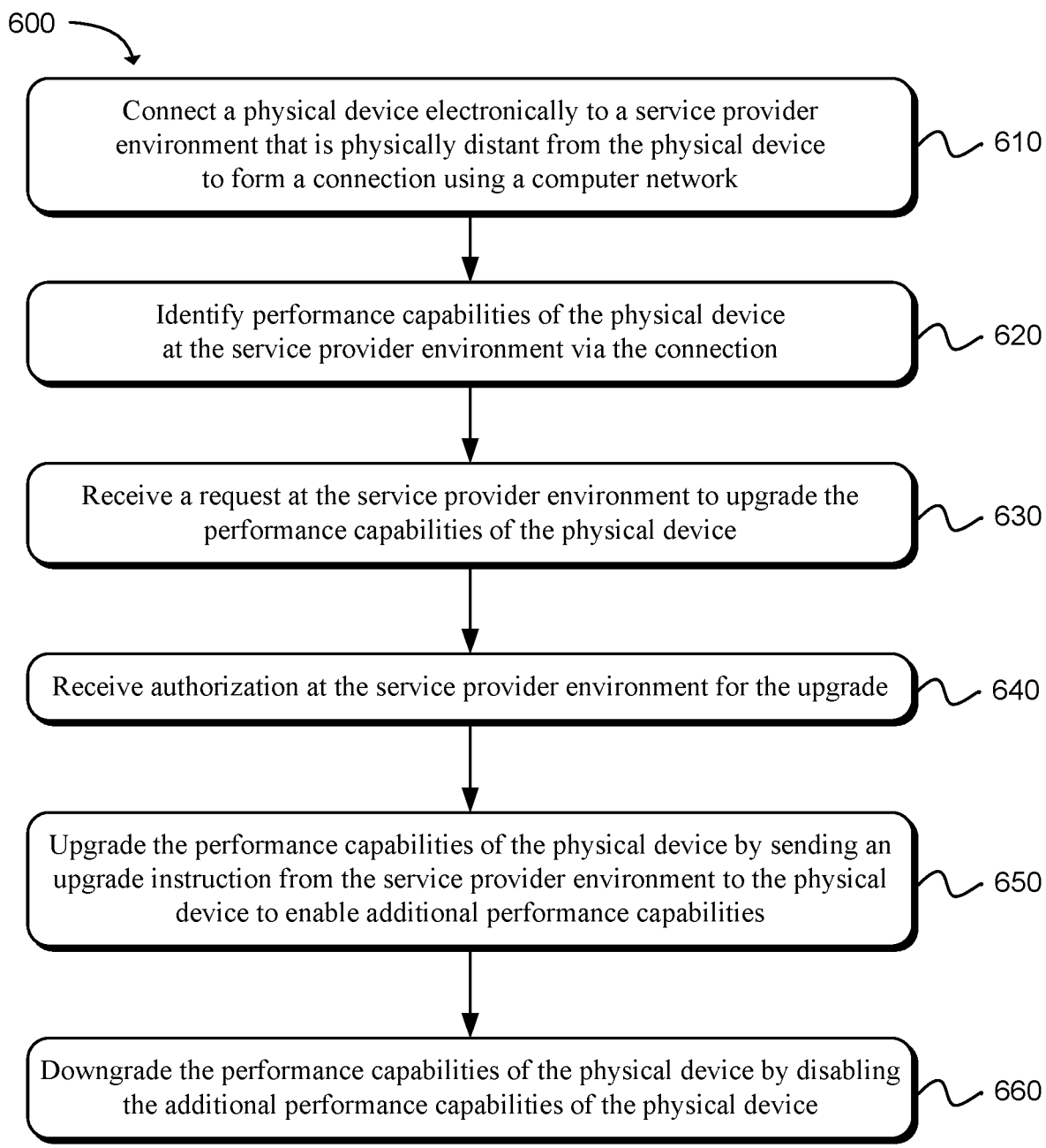
FIG. 6 is a flow diagram illustrating a method for upgrading and downgrading device capabilities for payment in accordance with an example of the present technology.

FIGS. 5-6 illustrate flow diagrams of methods according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 5, a flow diagram of a method 500 is illustrated for controlling IoT device performance capabilities. The method may include connecting 510 a physical computing device electronically to a service provider environment that is separate or remote from the physical computing device. The physical computing device may be an Internet of Things (IoT) device comprising at least a sensor and a processor. Other components may also be included, such as memory, networking hardware, etc. The method may include monitoring 520 utilization of the physical computing device from the service provider environment. For example, the IoT device may include a monitoring agent configured to monitor and collect data and to report the collected data to a monitoring service at the service provider environment. The monitoring service may collect, aggregate, analyze, and/or report on the monitored data. The monitoring agent may monitor for any desired metric. Some examples include monitoring which applications are executing, data storage resource usage, CPU utilization, latency, memory usage, error rates, network bandwidth utilization, network addresses to/from which data is transmitted/received, and so forth. Metrics data of the IoT device may be analyzed, trended, reported, etc. by the monitoring service to identify operational performance, resource utilization, utilization patterns, etc. of the IoT device being monitored. Developers, system administrators and/or end users may use the monitoring service to collect and track metrics, gain insight, and react promptly to control the IoT device. The monitoring service may provide a reliable, scalable, and flexible monitoring solution that may be readily implemented and used. The monitoring service may enable users to programmatically retrieve monitoring data, view graphs, and set alarms to assist in troubleshooting, spotting trends, and taking automated action based on the state of application(s) or service(s) in the service provider environment.

The method may include determining 530 that performance capabilities of the physical computing device exceed the utilization of the physical computing device. This determination may be made using the data collected by the monitoring agent and monitoring service. When connecting the IoT device electronically to the service provider environment, the connection may include identifying the IoT device to the service provider environment. The identifying may include identifying the performance capabilities of the IoT device. In another example, the service provider environment may perform a lookup in a data store based on the IoT device identification to determine the performance capabilities of the IoT device. Comparing the performance capabilities against the utilization, as determined by the monitoring service, the determination of whether the performance capabilities exceed the utilization may be determined. More specifically, a determination of whether the performance capabilities exceed the utilization by a predetermined threshold may be determined, or a determination of whether lesser performance capabilities would be sufficient to meet the utilization may be determined.

The method may include downgrading 540 the performance capabilities of the physical computing device by sending a downgrade instruction from the service provider environment to the physical computing device. For example, when the performance capabilities exceed the utilization, the performance capabilities of the physical computing device may be downgraded from the service provider environment. The downgrade may be performed by sending a configuration file or instruction from the service provider environment to the physical computing device and implementing the configuration file or instruction at the physical computing device. For example, the configuration may be applied to a bootloader of the physical computing device and a reboot of the physical computing device may result in the new configuration being applied. As another example, some configuration changes may be applied without a reboot simply by installing, storing, or modifying a configuration file.

The method may further include monitoring the physical computing device from the service provider environment to ensure the demand is met with the performance capabilities downgraded. If the demand is not being met with the downgraded capabilities, the performance capabilities may optionally be upgraded. The method may include upgrading the performance capabilities of the physical computing device before or after the downgrading. For example, the performance capabilities may be upgraded when the demand or utilization increases by sending an upgrade instruction from the service provider environment to the physical computing device. Upgrading or downgrading the performance capabilities may be performed on-demand, and/or dynamically in response to monitored utilization. Upgrades or downgrades may be permanent or temporary. Upgrades or downgrades may be time-based or may be conditioned upon any of a variety of factors, such as utilization of the physical computing device, payment for specific performance capabilities, type or source of application or content being processed or accessed by the physical computing device, etc. Where authorization, such as payment, is provided for upgrades, device capabilities may be upgraded for a period of time based on the payment, or may be upgraded for shorter periods of time than are paid for based on device usage. For example, device capabilities may be enabled and disabled multiple times until the authorization expires. In other words, when a payment is made, the capabilities can be toggled on and off repeatedly until the paid amount is consumed.

Downgrading the physical computing device performance capabilities may include, for example, one or more of decreasing a clock speed of the processor, decreasing a number of available cores of the processor, decreasing a partition size of storage for the IoT device, decreasing available memory for the IoT device, reducing network throughput, etc. Upgrading the physical computing device performance capabilities may thus conversely include one or more of increasing a clock speed of the processor, increasing a number of available cores of the processor, increasing a partition size of storage for the IoT device, increasing available memory for the IoT device, increasing network throughput, etc.

The method may include monitoring peak utilization hours and off-peak utilization hours. The peak and off-peak utilization hours may be determined by the monitoring service based on historical utilization. The method may include downgrading the performance capabilities during off-peak utilization hours and upgrading the performance capabilities during the peak utilization hours. In other words, the method may include determining that performance capabilities of the physical computing device exceed the utilization at consistent or periodic time periods based on historical monitoring, and upgrading or downgrading the performance capabilities may be scheduled for the periodic time periods based on the historical monitoring.

In some examples, this or other methods described herein may be implemented wholly or partially as computer readable program code executed by a processor and the computer readable code may be embodied on a non-transitory computer usable medium.

Referring now to FIG. 6, a flow diagram is illustrated for a method 600 of controlling IoT device performance capabilities. In this example, the method may include connecting 610 a physical device electronically to a service provider environment that is physically distant or remote from the physical device to form a connection using a computer network. The physical device may be an IoT device comprising at least a processor, a memory, and a sensor. The method may include identifying 620 performance capabilities of the physical device at the service provider environment via the connection. A request may be received 630 at the service provider environment to upgrade the performance capabilities of the physical device. A payment may be received 640 at the service provider environment for the upgrade. The performance capabilities of the physical device may be upgraded 650 by sending an upgrade instruction from the service provider environment to the physical device to unlock or make available additional performance capabilities for a defined period of time based on the payment. The performance capabilities of the physical device may be subsequently downgraded 660 by disabling the additional performance capabilities of the physical device at the expiration of the predetermined period of time.

Upgrading the performance capabilities may include one or more of: increasing a clock speed of the processor, increasing a number of available cores of the processor, increasing a partition size of storage for the physical device, increasing available memory for the physical device, etc. Downgrading the performance capabilities may include one or more of: decreasing a clock speed of the processor, decreasing a number of available cores of the processor, decreasing a partition size of storage for the physical device, decreasing available memory for the physical device, etc.

In one example, the sensor of the IoT device may be a camera. The camera may be configured to capture a still image as a performance capability. The additional performance capabilities to which the camera may be upgraded may include one or more of: the ability to capture both still images and video or night vision capabilities to capture images or video in low light conditions.

The method may include providing a graphical user interface accessible via the service provider environment. The graphical user interface may include various upgrade options for the physical device based on the performance capabilities identified. The graphical user interface may list a fee for each of the available upgrade options and may enable the payment for the upgrade. The graphical user interface may further provide scheduling options for scheduling a future time to start the predetermined period of time for the upgrade. For example, if an increased load on the device processor is expected on a specific date, the upgrade may be scheduled to begin on or before the specific date to accommodate the anticipated increased load.

In one example, the physical device may include a radio communications device to allow the physical device to communicate wirelessly with one or more other devices. For example, the radio communications device may be a WiFi device, LTE device, Bluetooth device, NFC device, Zigbee device or other type of radio communications device. Upgrading the physical device in this example may include increasing a throughput of the radio communications device. The method may include enabling one or more additional radios using one or more additional communication protocols in addition to what is used by the radio communications device prior to the upgrading. For example, if the device is a WiFi device, the upgrade may enable LTE, which uses different communication protocols than WiFi, and which may be used in addition to the WiFi to transmit data over both WiFi and LTE.

Figure 7:
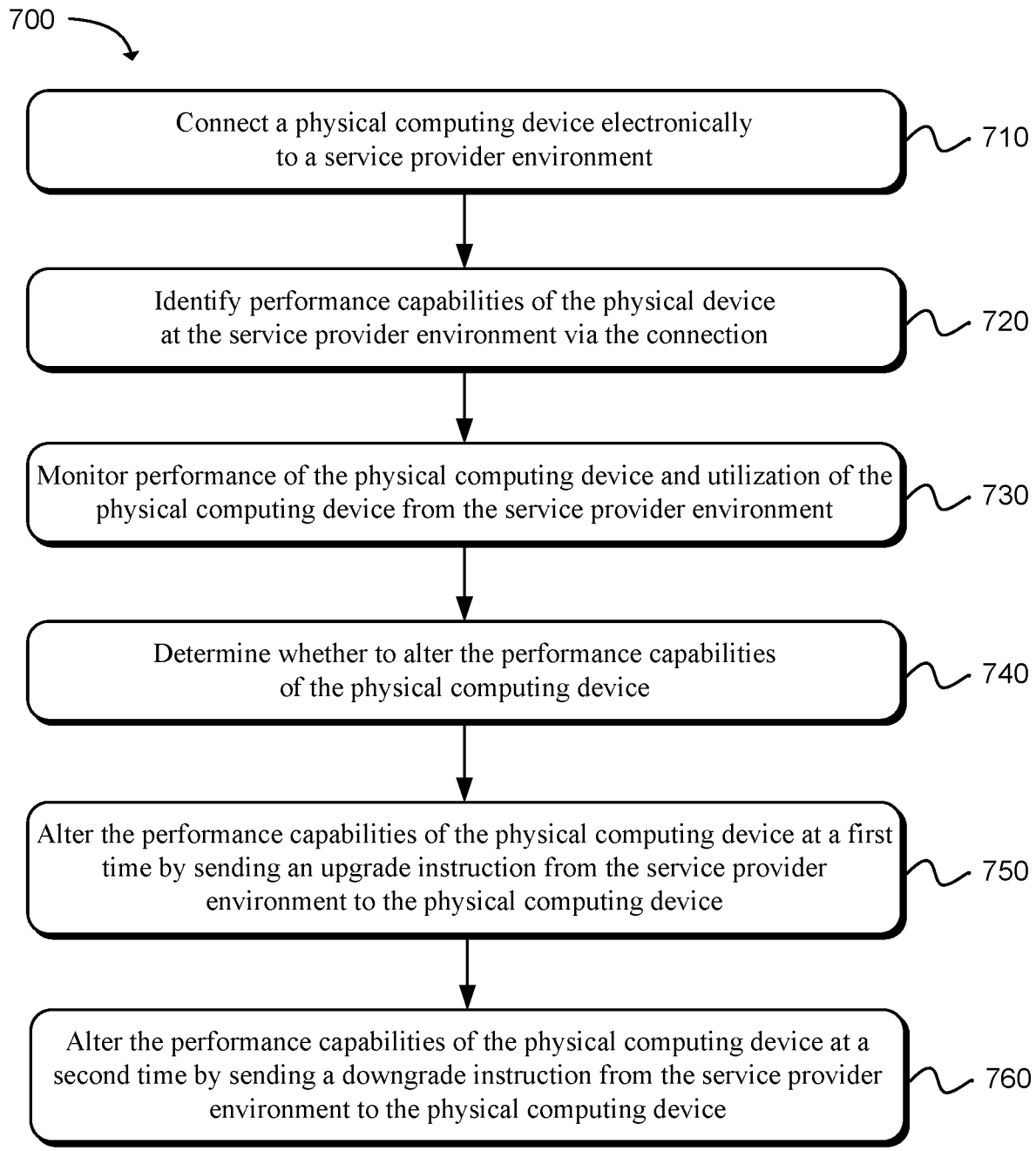
FIG. 7 is a flow diagram that illustrates a method for temporarily upgrading device capabilities in accordance with an example of the present technology.

Referring now to FIG. 7, a flow diagram is illustrated for another method 700 of controlling IoT device performance capabilities. In this example, the method may method include connecting 710 a physical computing device electronically to a service provider environment. The physical computing device may be an Internet of Things (IoT) device comprising at least a sensor and a processor. The method may include identifying 720 performance capabilities of the physical device at the service provider environment via the connection and monitoring 730 performance of the physical computing device and utilization of the physical computing device from the service provider environment. The monitoring may be performed using a monitoring agent and/or monitoring service as has been described. A determination 740 may be made of whether to alter the performance capabilities of the physical computing device based on the utilization. The performance capabilities of the physical computing device may be altered 750 at a first time by sending an upgrade instruction from the service provider environment to the physical computing device and may be altered 760 at a second time by sending a downgrade instruction from the service provider environment to the physical computing device.

The method may include predicting a failure of the physical computing device based on the performance of the physical computing device and the utilization of the physical computing device. For example, the service provider environment may monitor a large number of similar physical computing devices using the monitoring service and may aggregate device failure information for these devices when the fail. The historical performance of and utilization of the physical computing devices leading up to the failure may be used to create a model for predicting when another physical computing device will fail. For example, the performance and utilization of the physical computing device may be compared to those devices that have already failed to determine whether it is likely the current device will also fail. In one example, a score or percentage chance of failure may be determined based on the comparison or the use of the model. The prediction may identify an approximate remaining lifetime of the physical computing device before failure.

In one example, the method may include recommending a performance profile to a user. The performance profile may be configured for sustainability and longevity of the physical computing device, such as to extend the usable lifetime of the physical computing device prior to failure. The performance profile may alter the performance capabilities of the physical computing device based on current utilization and historical performance or utilization. The recommendation may be based in part on the model created from failure of other computing devices, for example.

In one example, the physical computing device may include multiple physical computing devices. Altering the performance capabilities in this example may include sending a downgrade instruction from the service provider environment to at least one of the plurality of physical computing devices to reduce the performance capabilities of the at least one of the plurality of physical computing devices. In other words, where a user may use any number of the physical computing devices or have these physical computing devices associated with a single user account, performance capabilities may be determined on a per device basis, such as based on utilization, payment, performance profile, etc. In one example, the method may include altering the performance capabilities of the physical computing device at the first and second times according to user-defined schedule.

The method may include altering the performance capabilities of the physical computing device temporarily at the first time by sending an upgrade instruction from the service provider environment to the physical computing device when the utilization increases. The method may further include altering the performance capabilities of the physical computing device temporarily at the second time by sending the downgrade instruction from the service provider environment to the physical computing device when the utilization decreases.

The method may include determining changes to a file stored at the physical computing device to alter the performance capabilities of the physical computing device. The determination may be made from the service provider environment. The service provider environment may then sending the changes to the physical computing device and the changes may be received at and implemented by the physical computing device. In another example, the method may include determining changes to a bootloader of the physical computing device to alter the performance capabilities of the physical computing device. A reboot instruction may be sent to the physical computing device from the service provider environment or may be included as part of the configuration change request sent from the service provider environment with the instructions to modify the bootloader.

The method may include altering the performance capabilities by sending the upgrade instruction or the downgrade instruction based on an application in use at the physical computing device. In this example, use of predetermined applications result in sending the upgrade instruction independently of the utilization. As another example, processing or sending or receiving data of a particular type or to/from a specific source/destination may result in the upgrade or downgrade of the performance capabilities. In these examples, a developer, publisher, content provider or other entity may contract with the service provider environment to enable increased performance capabilities for the applications, data type, data source/destination, etc.

Figure 8:
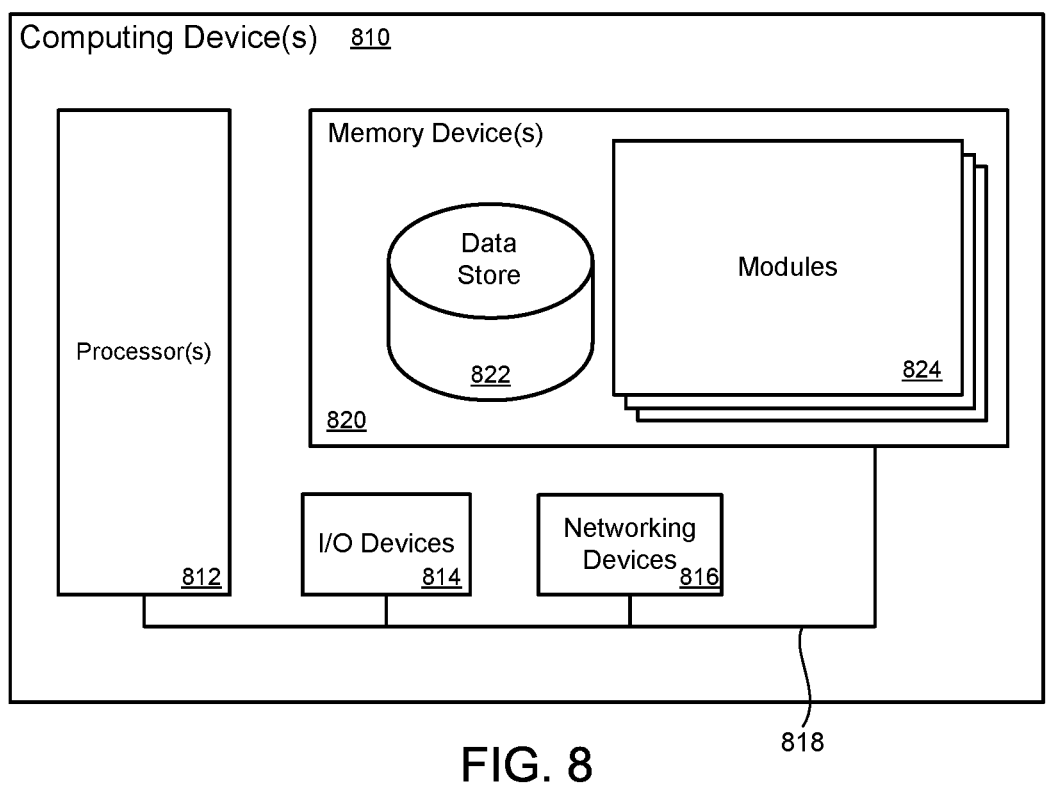
FIG. 8 is block diagram illustrating a computing device that may be used to execute a system or method for managing device capabilities in accordance with an example of the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data setting such as a carrier wave or other transport mechanism and includes any information delivery media. A "modulated data setting" means a setting that has one or more of its characteristics set or changed in such a manner as to encode information in the setting. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer-implemented method for device capabilities management from a service provider environment, comprising:
    receiving a connection over a network from a physical computing device at a service provider environment, the physical computing device being an Internet of Things (IoT) device comprising at least a processor, the service provider environment hosting one or more physical servers to provide one or more computing services;
    monitoring utilization of a component of the physical computing device using the service provider environment;
    upgrading performance capabilities of the component of the physical computing device from a first set of artificial limits to a second set of artificial limits on the physical device to include additional performance capabilities when an authorization is received at the service provider environment;
    determining that the performance capabilities of the component of the physical computing device exceeds the utilization of the component of the physical computing device monitored by the service provider environment; and
    downgrading the performance capabilities of the component of the physical computing device from the second set of artificial limits to the first set of artificial limits on the physical computing device by disabling access to the additional performance capabilities when the authorization expires and sending a downgrade instruction from the service provider environment to the physical computing device using the connection, wherein the additional performance capabilities are enabled or disabled based on utilization of the component of the physical computing device until the authorization expires.

2. The method of claim 1, wherein downgrading comprises one or more of: decreasing a clock speed of the processor, decreasing a number of available cores of the processor, decreasing a partition size of storage for the IoT device, or decreasing available memory for the IoT device.

3. The method of claim 1, further comprising upgrading the performance capabilities of the physical computing device when the utilization increases by sending an upgrade instruction from the service provider environment to the physical computing device.

4. The method of claim 1, further comprising:
    monitoring peak utilization hours and off-peak utilization hours; and
    downgrading the performance capabilities during off-peak utilization hours.

5. The method of claim 1, further comprising:
determining that performance capabilities of the physical computing device exceed the utilization at periodic time periods based on historical monitoring; and
scheduling the downgrading for the periodic time periods based on the historical monitoring.

6. A computer-implemented method, comprising:
receiving a connection from a physical device at a service provider environment to form a connection using a computer network;
identifying performance capabilities of the physical device at the service provider environment via the connection;
receiving a request at the service provider environment to upgrade the performance capabilities of the physical device;
receiving an authorization at the service provider environment for additional performance capabilities of the physical device associated with the upgrade;
upgrading the performance capabilities of the physical device from a first and set of artificial limits to a second set of artificial limits on the physical device to include the additional performance capabilities by sending an upgrade instruction from the service provider environment to the physical device;
monitoring utilization of the physical device using the service provider environment;
determining that the performance capabilities of the physical device exceeds the utilization of the physical device; and
downgrading the performance capabilities of the physical device from the second set of artificial limits to the first set of artificial limits by disabling access to the additional performance capabilities of the physical device when the authorization expires, wherein the additional performance capabilities are enabled or disabled based on utilization of the physical device until the authorization expires.

7. The method of claim 6, wherein upgrading comprises one or more of: increasing a clock speed of a processor, increasing a number of available cores of the processor, increasing a partition size of storage for the physical device, or increasing available memory for the physical device.

8. The method of claim 6, further comprising enabling and disabling the additional performance capabilities based on utilization of the physical device until the authorization expires.

9. The method of claim 6, further comprising providing a graphical user interface, the graphical user interface including at least one of: a plurality of upgrade options for the physical device based on the performance capabilities identified, listing a fee for each of the plurality of upgrade options, enabling the authorization, or providing scheduling options for scheduling a future time to add the additional performance capabilities.

10. The method of claim 6, wherein the physical device comprises a radio communications device and upgrading the physical device comprises increasing a throughput of the radio communications device by enabling one or more additional radios using one or more additional communication protocols.

11. The method of claim 6, further comprising:
monitoring peak utilization hours and off-peak utilization hours; and
downgrading the performance capabilities during off-peak utilization hours.

12. The method of claim 6, further comprising:
determining that performance capabilities of the physical device exceed the utilization at periodic time periods based on historical monitoring; and
scheduling the downgrading for the periodic time periods based on the historical monitoring.

13. A computer-implemented method, comprising:
receiving, at a service provider environment hosting a plurality of servers providing one or more services, a connection electronically from a physical computing device, wherein the physical computing device is an Internet of Things (IoT) device comprising at least a sensor and a processor;
identifying performance capabilities of the physical device at the service provider environment via the connection;
monitoring performance of the physical computing device and utilization of the physical computing device from the service provider environment;
determining, at the service provider environment, whether to alter the performance capabilities of the physical computing device; and
sending instructions to alter the performance capabilities of the physical computing device from a first set of artificial limits to a second set of artificial limits on the physical computing device temporarily at a first time and reverting the performance capabilities from the second set of artificial limits to the first set of artificial limits on the physical computing device at a second time by sending updated instructions from the service provider environment to the physical computing device,
wherein the instructions include an upgrade instruction to upgrade the performance capabilities to include additional performance capabilities when an authorization is received at the service provider environment and the updated instructions include a downgrade instruction to disable access to the additional performance capabilities when the authorization expires and when the additional performance capabilities of the physical computing device exceeds a utilization of the physical computing device, wherein the additional performance capabilities are enabled or disabled based on utilization of the physical computing device until the authorization expires.

14. The method of claim 13, wherein the updated instructions include an upgrade instruction and a downgrade instruction, the method further comprising sending instructions to alter the performance capabilities by sending one of the upgrade instruction or the downgrade instruction at the first time based on an application in use at the physical computing device, where use of predetermined applications result in sending the upgrade instruction independently of the utilization.

15. The method of claim 13, further comprising sending instructions to alter the performance capabilities of the physical computing device at the first and second times according to user-defined schedule.

16. The method of claim 13, further comprising:
sending instructions to alter the performance capabilities of the physical computing device temporarily at the first time by sending an downgrade instruction from the service provider environment to the physical computing device when the utilization increases; and
sending instructions to alter the performance capabilities of the physical computing device temporarily at the second time by sending an upgrade instruction from the service provider environment to the physical computing device when the utilization decreases.

17. The method of claim 13, further comprising recommending a performance profile to a user, the performance profile being configured for sustainability and longevity of the physical computing device, wherein the performance profile alters the performance capabilities of the physical computing device based on the utilization and historical performance.

18. The method of claim 13, wherein the physical computing device comprises a plurality of physical computing devices, and sending instructions to alter the performance capabilities comprises sending a downgrade instruction from the service provider environment to at least one of the plurality of physical computing devices to reduce the performance capabilities of the at least one of the plurality of physical computing devices.

19. The method of claim 13, further comprising determining changes to a file stored at the physical computing device to alter the performance capabilities of the physical computing device and sending the changes to the physical computing device from the service provider environment.

20. The method of claim 13, further comprising determining changes to a bootloader of the physical computing device to alter the performance capabilities of the physical computing device, sending the changes to the physical computing device from the service provider environment, and sending a reboot instruction to the physical computing device from the service provider environment.

21. The method of claim 13, further comprising predicting a hardware failure of the physical computing device based on the performance of the physical computing device and the utilization of the physical computing device.

* * * * *